United States Patent [19]

Urbansky

[11] Patent Number: 5,132,970
[45] Date of Patent: Jul. 21, 1992

[54] BIT RATE ADAPTATION CIRCUIT ARRANGEMENT COMPRISING A JUSTIFICATION DECISION CIRCUIT

[75] Inventor: Ralph Urbansky, Schwaig, Fed. Rep. of Germany

[73] Assignee: U.S. Philips Corporation, New York, N.Y.

[21] Appl. No.: 549,345

[22] Filed: Jul. 6, 1990

Related U.S. Application Data

[63] Continuation-in-part of Ser. No. 540,996, Jun. 20, 1990.

[30] Foreign Application Priority Data

Jul. 12, 1989 [DE] Fed. Rep. of Germany ....... 3922897

[51] Int. Cl.⁵ .............................................. H04J 3/07
[52] U.S. Cl. .................................... 370/102; 375/112
[58] Field of Search ................ 370/102; 375/111, 112;
364/200 MS File, 900 MS File

[56] References Cited

U.S. PATENT DOCUMENTS

| | | |
|---|---|---|
| 3,420,956 | 1/1969 | Heightly et al. |
| 4,002,844 | 1/1977 | Doussoux ............................ 370/102 |
| 4,132,862 | 1/1979 | Ferret et al. ....................... 370/102 |
| 4,323,790 | 4/1982 | Dunning et al. ..................... 370/102 |
| 4,355,387 | 10/1982 | Portejoie et al. .................... 370/102 |
| 4,542,500 | 9/1985 | Jean-Claude ........................ 370/102 |
| 4,709,227 | 11/1987 | Guerillot .......................... 370/102 X |
| 4,791,652 | 12/1988 | McEachern et al. .................. 375/111 |
| 4,811,340 | 3/1989 | McEachern et al. .................. 370/102 |
| 4,885,746 | 12/1989 | Fukushima et al. ................... 370/102 |
| 4,920,547 | 4/1990 | Murakami ......................... 370/102 X |

FOREIGN PATENT DOCUMENTS 3124384 1/1985 Australia .
133279 7/1984 European Pat. Off. .

Primary Examiner—Thomas M. Heckler
Attorney, Agent, or Firm—Leroy Eason

[57] ABSTRACT

A circuit arrangement for adapting the bit rates of two signals includes an elastic store into which the data of the first signal are written in parallel in groups of n bits and from which the data bits of the second signal are read out in parallel. A selection matrix for inserting justification bits in the second signal is connected to the output of the elastic store. Writing into the store is controlled by a write counter and read-out therefrom into the selection matrix is controlled by a read counter. A subtractor forms the difference between the counts. A justification decision circuit, which can be realized all or part in CMOS technology and is capable of bit rates of the order of 140 Mbits per second, is connected to the subtractor and the read counter so as to form a control loop for the elastic store. The justification decision circuit includes a controller which produces an output signal corresponding to a running integrated summation of the differences produced by the subtractor, and a pulse distribution circuit. The output signal of the controller controls the pulse distribution circuit to supply pulses which cause the selection matrix to insert justification bits, and cause the read counter to compensate for a difference in the bit rates of the first and second signals.

4 Claims, 1 Drawing Sheet

BIT RATE ADAPTATION CIRCUIT ARRANGEMENT COMPRISING A JUSTIFICATION DECISION CIRCUIT

RELATED APPLICATION

This application is a continuation-in-part of copending application Ser. No. 540,996, filed Jun. 20, 1990, assigned to a common assignee, which corresponds to German patent application No. DE 39 20 391.

BACKGROUND OF THE INVENTION

1. Field of the Invention

The invention relates to a circuit arrangement for adapting the bit rates of two signals, arrangement such comprising a justification decision circuit and also comprising, for example, an elastic store into which the data of a first signal are written in parallel in groups of n bits and read out again in signal are written in parallel in groups of n bits and read out again in parallel. A selection matrix for inserting justification bits is connected after the elastic store. The writing process is controlled by a write counter and the reading process by a read counter, and a subtractor that forms the difference between the counts is also connected after the elastic store.

2. Description of the Related Art

Such a circuit arrangement for adapting bit rates is described, for example, in the above-referenced German Patent Application No. DE 39 20 391 and corresponding U.S. application Ser. No. 540,996. Circuit arrangements of this type are necessary in data communication, for example, for plesiochronous multiplexers that combine plesiochronous signals. Two binary signals are termed plesiochronous when their bit rates are nominally equal, but may in fact deviate from the nominal value within a specific tolerance range. Before plesiochronous signals can be combined by a plesiochronous multiplexer, they all have to be brought to the same bit rate which (in so-called positive justification technology) is slightly higher than the bit rae the individual plesiochronous signals have. This difference between the bit rates is eliminated, inter alia, in that so-called justification bits are occasionally added to the signal having the higher bit rate. A circuit arrangement that carries out operations of this type is also termed a clock alignment circuit.

On the receive side of a transmission system a plesiochronous multiplexer can be connected after a corresponding bit rate adaptation circuit arrangement in order to remove the justification bits and bring the bit rate back to the original value. Justification decision circuits for circuit arrangements for adapting the bit rates of two binary signals, in which the signals are written into an elastic store in series and also read out again in series, are known (see, for example, DT 25 18 051 A, which corresponds to U.S. Pat. No. 4,002,844). If a circuit arrangement of this type is utilized for bit rates of the order of 140 Mbit/s and over, the arrangement—including the justification decision circuit—must be realised in ECL technology because CMOS circuits are not suited to operation at such high frequencies. However, in circuits employing ECL technology higher power losses occur than in comparable circuits in CMOS technology.

SUMMARY OF THE INVENTION

It is an object of the invention to provide a justification decision circuit of the type described in the opening paragraph, which enables a bit rate adaptation circuit arrangement—even for bit rates of the order of 140 Mbit/s—to be realized in CMOS or equivalent technology. A further object is to provide such a justification decision circuit which effectively stabilizes the contents of the elastic store during bit rate adaptation.

These objects are achieved by implementing the following circuit features:

1. the subtractor, a controller included in the justification decision circuit and having an integrating or I-behaviour as described hereinafter, a pulse distribution circuit and the read counter form a control loop for the elastic store;

2. the pulse distribution circuit initiates at least one of the following operations when a sync pulse is supplied from an external source:
   a) it generates a justification indication bit if a carry has taken place between the last and the current sync pulse at a preset bit position in the output signal of the controller;
   b) it transmits to the selection matrix a signal for inserting a justification bit;
   c) it transmits to the read counter a signal holding the counter for one clock period, if the number of the justification bits inserted up to the current sync pulse exceeds an integer multiple of n.

As will be further explained hereinbelow, the number n is the number of parallel lines over which the n bits of a first signal are written in parallel into the buffer. In the same manner the n parallel bits are again read out from the buffer at the same useful bit rate. Write and read counters are timed with clocks that are produced by reducing the bit clocks of the two signals in the ratio of 1:n. The justification decision circuit according to the invention in principle requires no faster clock than one of these bit clocks reduced in the ratio of 1:n. Thus, with a given bit rate the number n is to be selected high enough for the justification decision circuit according to the invention to be arranged in CMOS technology. If, for example, the bit rate is of the order of 140 MHz and the storing operations are carried out in bytes (n=8), the arrangement according to the invention will in principle need only clock rates of about 20 MHz and can thus be conveniently realised in CMOS technology.

BRIEF DESCRIPTION OF THE DRAWING

The invention will be further explained with reference to the drawings of a preferred embodiment, in which.

DESCRIPTION OF THE PREFERRED EMBODIMENTS

Figure 1:
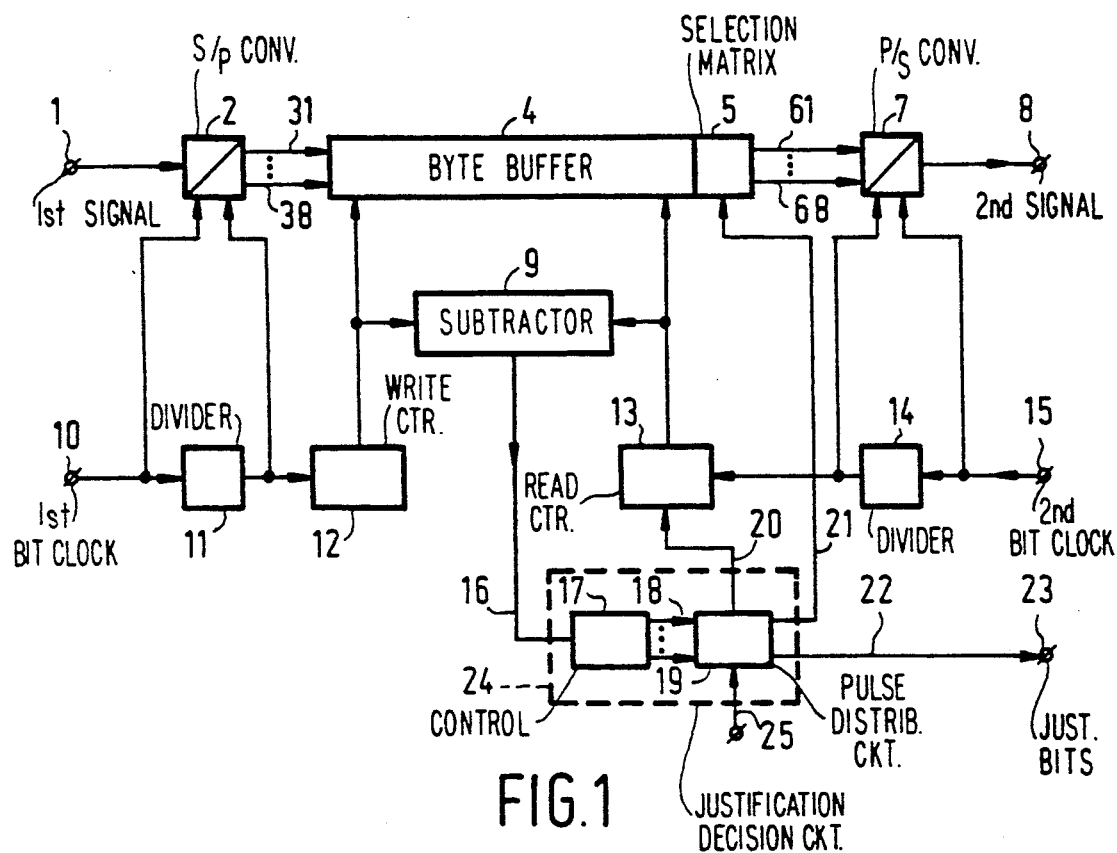
FIG. 1 shows a circuit arrangement for bit rate adaptation comprising a justification decision circuit according to the invention.

In FIG. 1 a first binary signal having a nominal bit rate of 139.264 Mbit/s is available at a terminal 1 and at an output terminal 8 a second binary signal is produced having a nominal bit rate of 155.52 Mbit/s and structured in frames. The second binary signal contains justification bits, justification indication bits and further auxiliary indication bits in addition to all the bits of the first signal. The frame is the so-called synchronous transport module STM-1 (cf. in this respect, for example, CCITT Draft Recommendations G 707, G 708 and G 709); it is arranged in lines and each line is again structured in bytes.

The bit clock of the first signal is available at a terminal 10. This clock is reduced by a first divider 11 in the ratio of 1:8. The reduced clock—called the write clock hereinafter—has a pulse repetition rate of 17.408 MHz. Thus, in the present example the integer variable n can generally be selected to be eight.

The write clock and the original bit clock are applied to a serial-to-parallel converter 2 which converts eight serial bits of the first signal into eight parallel bits to be transported over lines 31 to 38 to eight read inputs of a buffer 4. On each of the lines 31 to 38 bits are available at the 17.408 MHz repetition rate so that all the modules—except for a parallel-to-serial converter 7 at the output and a frequency divider 14 at the input—are arranged in low-loss CMOS technology.

A first address counter 12—called the write counter hereinafter—is incremented by the write clock and cyclically produces write addresses for the eight-bit-wide (1 byte) buffer 4. The first signal is stored byte-to-byte in buffer 4 at one of the write addresses produced by the write counter 12. The bit clock of the second binary signal, which clock is available at a terminal 15, is conveyed to a second divider 14 which divides this clock also in the ratio of 1:8. The bit clock is generated by a timing controller of a multiplexer (not shown) and has clock gaps occurring at predetermined locations in the frame so as to realise a coarse adaptation of the bit rates.

This divided clock—called the read clock hereinafter—and the original bit clock provide the timing of a parallel-to-serial converter 7 which converts the first signal processed in parallel into the serial second signal at a bit rate of 155.52 Mbit/s and produces this second signal at output terminal 8.

The counter 13 uses the read clock for cyclically generating read addresses. A comparison of the addresses takes place in a subtractor 9 that subtracts the count of the read counter from the count of the write counter. In the present example the address encoders (not shown) of buffer memory 4 are structured such that the memory locations which are written and the memory locations which are read out have a fixed predetermined distance between them when the two counts match. This nominal distance can be retained on average throughout the operation of the circuit arrangement. It is retained by means of a control loop constituted by a justification decision circuit 24, the read counter 13 and the subtractor 9. Because the read clock is the faster of the two, the read counter 13 is stopped from time to time so that its count approximately matches the count of the write counter 12. When the difference between write and read counters has been positive for a rather long period of time, a so-called variable justification bit will be inserted into the second signal at a specific predetermined location by means of a selection matrix 5, which at a predetermined interval receives a pulse from a pulse distribution circuit 19, with which circuit the condition of the selection matrix 5 is adjusted such that one bit is repeated and transmitted as a justification bit over a predetermined line out of the eight parallel lines (for the operation of the selection matrix cf. the above-referenced patent application Ser. No. 540,996 or corresponding DE 39 20 391). Once eight bits have been justified, the read counter 13 receives, at a predetermined instant, a signal from the pulse distribution circuit 19 through a line 20, by means of which signal the counter is stopped for the duration of one clock period. The justification decision circuit receives from the exterior—denoted by a line 25—sync pulses for controlling the building blocks 5 and 13 at the right instants. These pulses are also transmitted to the circuit 24 by the timing controller of the multiplexer (not shown).

The controller 17 of the control loop is a controller having an I-behaviour, whose output signal is available on lines 18 and which is evaluated by the pulse distribution circuit 19. The pulse distribution circuit 19 applies a justification indication bit to the multiplexer (not shown) over a line 22. This justification indication bit passes through a terminal 23 and indicates that a second bit has to be justified owing to the excessive difference between the counts; the multiplexer will insert it into the data stream at a predetermined location in the form of a justification indication bit.

Figure 2:
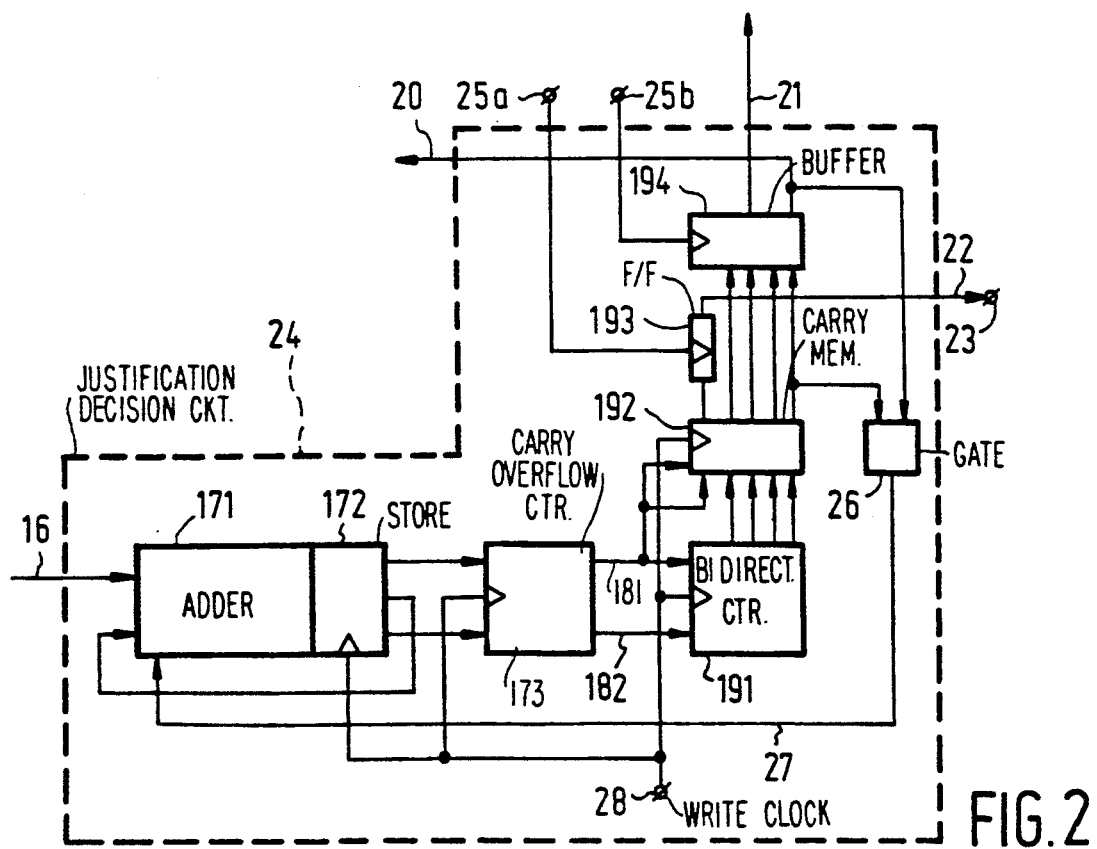
FIG. 2 shows details of a justification decision circuit according to the invention.

FIG. 2 shows details of the justification decision circuit 24. The integration of the justification decision circuit in the circuit arrangement of FIG. 1 is shown by denoting supply lines to the justification decision circuit 24 with the same reference characters as the supply lines in FIG. 1. Building blocks that constitute an operational unit as shown in FIG. 1 are denoted in FIG. 2 by reference characters starting with similar initial digits.

The controller 17 that has an I-behaviour comprises an adder 171 as well as a store 172 connected after this adder. A controller having an I-behaviour—i.e. also I-behaviour or only I-behaviour—is necessary because the difference between the counts (without a controller) enhances proportionally with time. Such a delay cannot be adjusted with a controller not having an I-behaviour.

Owing to the feedback of the store 172 to the input of the adder 171 and the connection of the adder 171 to the output of the subtractor 9 via line 16, the output signal of the subtractor 9 is added to the storage contents of the store 172 with each clock pulse of the write clock. After the store 172 there is a counter 173 which is incremented by unity each time a carry is effected to the most significant bit position when the differences are summed up in store 172. The first counter 173 is decremented by unity when the store 172 presents a negative overflow. Also the first counter 173 is timed by the write clock which is available at a terminal 28; it counts the carriers with positive and negative overflows of the store 172 and thus enhances the width of the store 172. The length of the first counter 173 is one of the parameters of the control loop (time constant), which can be determined by those skilled in the art. In the present example the first counter 173 has twelve stages. The number of these stages determines a preset bit position in a store 173 of any width, of which a change of the value indicates that a justification bit has to be inserted into the data stream of the second signal (justification demand). If the counter 173 presents a positive overflow, this is considered a signal for a bit to be justified at the next instant. The positive overflow is retained by means of the connection of a line 181 to both the enable input and a data input of a carry memory 192 which is also timed by the write clock. The contents of the first stage of the carry memory 192 is read out by a first sync pulse (line pulse), which is available at a terminal 25a, to a flip-flop 193 and transmitted as justification indication bits through a line 22 and over a terminal 23 to a multiplexer (not shown). By means of lines 181 and 182 the first counter 173 is connected to a second four-stage counter 191. Also the second counter 191 is a bidirectional counter which is incremented by unity when the first counter 173 has a positive overflow and decremented by unit when the counter 173 has a negative overflow. The second counter 191 counts modulo-8 the justification demands which are also stored in the carry memory 192. From there they are stored in a buffer 194 at selected clock instants, available at a terminal 25b, and are further tranmsmitted via the line 21 to the selection matrix or via the line 20 to the read counter. The read counter is stopped for one clock period only when the number of justification demands exceeds an integer multiple of eight; at the same time, the condition of the selection matrix is changed such that no information becomes lost (cf. in this context patent application Ser. No. 540,996, or corresponding DE 39 20 391). Thus, over the line 20 a pulse is transmitted when a carry is effected from the first three stages of the counter 191 to the fourth stage, the counter 191 has transmitted this carry pulse to the carry memory 192 and a sync pulse appears at terminal 25b.

The length of the counter 173 determines—as has already been indicated—the control time constant; the larger the counter the larger also the control time constant. A large control time constant reduces the waiting time jitter of the transmission system (on waiting time jitter cf., for example, patent application Ser. No. 540,996 or DE 39 20 391 and the literature on this subject referenced therein). On the other hand, a large control time constant means that differences will be adapted only slowly and, consequently, there is a danger of the buffer 4 having an overflow if it is not dimensioned unjustifiably large.

In order to resolve this problem a gate 26 is provided which measures the difference between the binary values which occurs between the line 20 and the corresponding signal prior to a transfer to the buffer 194. This difference is added to the input data of the adder 171 and has the same effect as if the write counter were stopped at the instant when the justification demands exceed an integer multiple of 8. By implementing this measure, waiting time jitter is reduced without an increase of the control time constant.

The function of the described bit rate adaptation circuit can also be performed entirely or in part by an appropriately programmed computer. Such programming is within grasp of those skilled in the art because the complete circuit consists of only elementary digital building blocks and a software equivalent thereof is either obvious or known from literature (cf., for example: Electronics, Oct. 12, (1978), p. 148).

I claim:

1. A circuit arrangement for adapting the bit rates of two digital signals, comprising an elastic store (4) having an input at which the data of the first signal can be written in parallel in groups of "n" bits ($n \geq 1$) and an output at which the data of the second signal can be read out in parallel; a selection matrix for inserting justification bits in said second signal and which is connected to the output of the elastic store; writing of data into the elastic store being controlled by a write counter (12) and reading out of data therefrom being controlled by a read counter (13); and a subtractor (9) connected to the elastic store for deriving the running difference between the read and write counts during reading and writing of data therein; characterized in that said adaptation circuit arrangement further comprises:

a justification decision circuit (24) connected to said subtractor (9) and to said read counter (13) so as to form therewith a control loop for the elastic store, said justification decision circuit including a controller (17) and a pulse distribution circuit (19);

said controller (17) comprising adding means (171, 172) connected to said subtractor (9) for deriving a running integrated sum of the differences produced thereby and a first counter (173) connected to said adding means for counting overflow carries of the integrated sums produced thereby, said first counter (173) supplying output signal to said pulse distribution circuit which signify when justification bits are to be supplied by such circuit to said selection matrix;

said pulse distribution circuit (19) being adapted to initiate at least one of the following operations in response to sync pulses (25) externally supplied thereto:
   (a) generate a justification indication bit in response to a present sync pulse if since the last previous sync pulse a carry has occurred at the preset bit position in the output signal produced by said first counter (173);
   (b) transmit to said selection matrix (5) a signal which causes it to insert a justification bit;
   (c) transmit to said read counter (13) a signal which holds the count therein for one clock period if the number of justification bits inserted prior to a present sync pulse exceeds an integral multiple of "n".

2. A circuit arrangement as claimed in claim 1, characterized in that said adding means comprises an adder (171) and a store (172) connected to said first counter (173) in that order; said first counter (173) is bidirectional; and said adder (171) is connected to said subtractor (9) so as to accumulate in said store (172) the integrated sum of the differences formed by said subtractor (9); said bidirectional first counter (173) receiving an increment pulse from said store (172) when such store has a positive overflow and receiving a decrement pulse therefrom when such store has a negative overflow.

3. A circuit arrangement as claimed in claim 2, further characterized in that said pulse distribution circuit (19) comprises: a second bidirectional counter (191) for counting the number of carries at said preset bit position in the output signal of said first counter (173), taking into account the sign of such output signal; a carry store (192) in which the contents of the second bidirectional counter (191) and also the carry pulse itself are stored each time a carry occurs; a third store (193) into which the carry pulse is transferred from the carry store (192) each time a first sync pulse 25(a) is supplied to said third store (193); and a buffer (194) into which the remaining contents of the carry store (192) are transferred each time a second sync pulse 25(b) is supplied to said buffer (194).

4. A circuit arrangement as claimed in claim 3, wherein said justification decision circuit further comprises a gate (26) for forming the difference between the binary values of the most significant bit at the input and output of said buffer (194) and supplying such difference as an additional input to said adder (171).

* * * * *